United States Patent [19]

Matla et al.

[11] 4,217,612
[45] Aug. 12, 1980

[54] SERVO SYSTEM FOR TRACK ACCESSING AND TRACK FOLLOWING IN A DISK DRIVE

[75] Inventors: Arno Matla, Waldenbuch; Volker Zimmermann, Schoenaich, both of Fed. Rep. of Germany

[73] Assignee: International Business Machines Corporation, Armonk, N.Y.

[21] Appl. No.: 963,701

[22] Filed: Nov. 27, 1978

[30] Foreign Application Priority Data

Dec. 30, 1977 [DE] Fed. Rep. of Germany ....... 2759066

[51] Int. Cl.$^2$ .................... G11B 5/56; G11B 21/08; G11B 21/10
[52] U.S. Cl. .................... 360/78; 318/653; 360/77; 360/135
[58] Field of Search ............ 360/78, 77, 75, 106, 360/109, 135; 318/653, 638

[56] References Cited

U.S. PATENT DOCUMENTS

| | | | |
|---|---|---|---|
| 3,185,972 | 5/1965 | Sippel | 360/109 |
| 3,691,543 | 9/1972 | Mueller | 360/77 |
| 3,737,883 | 6/1973 | Sordello et al. | 360/78 |
| 3,881,184 | 4/1975 | Koepcke et al. | 360/78 |
| 3,924,268 | 12/1975 | McIntosh et al. | 360/78 |
| 4,048,660 | 9/1977 | Dennison et al. | 360/77 |
| 4,087,843 | 5/1978 | Louis et al. | 360/78 |
| 4,135,217 | 1/1979 | Jacques et al. | 360/78 |

Primary Examiner—Alfred H. Eddleman
Attorney, Agent, or Firm—Nathan N. Kallman

[57] ABSTRACT

During the access mode of a movable magnetic head in a disk file, a program of position control signals is derived from a simulator, the input of which is clocked at sector time intervals. The position control signals of the simulator are periodically transferred to the summing point of a servo loop which successively is error conditioned, dependent on the subsequent nominal magnetic head positions derived from the simulator. Servo sectors on the data disk are sampled by the magnetic head, evaluated and converted to a digitally coded position error signal. The error signal is summed with a digital position control signal, and the output sum signal in analog form is applied to the motor that drives the head. The track following function is accomplished by means of a closed servo loop, which is also used in the access mode.

7 Claims, 10 Drawing Figures

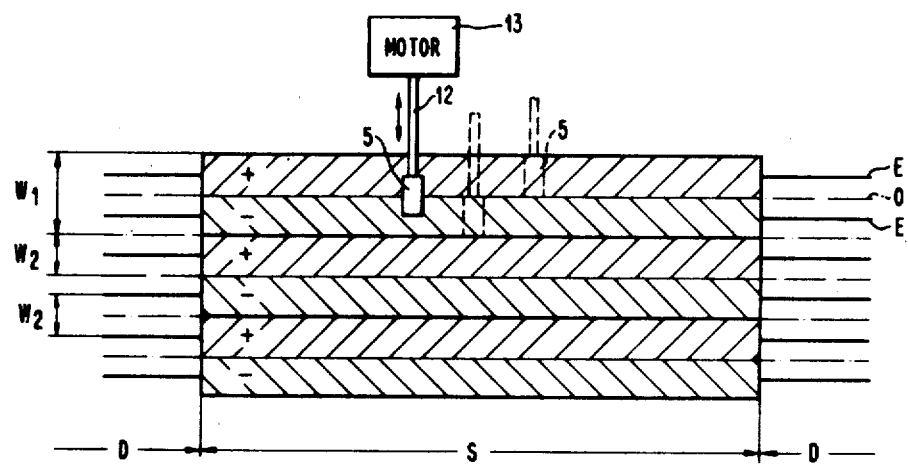
FIG. 2
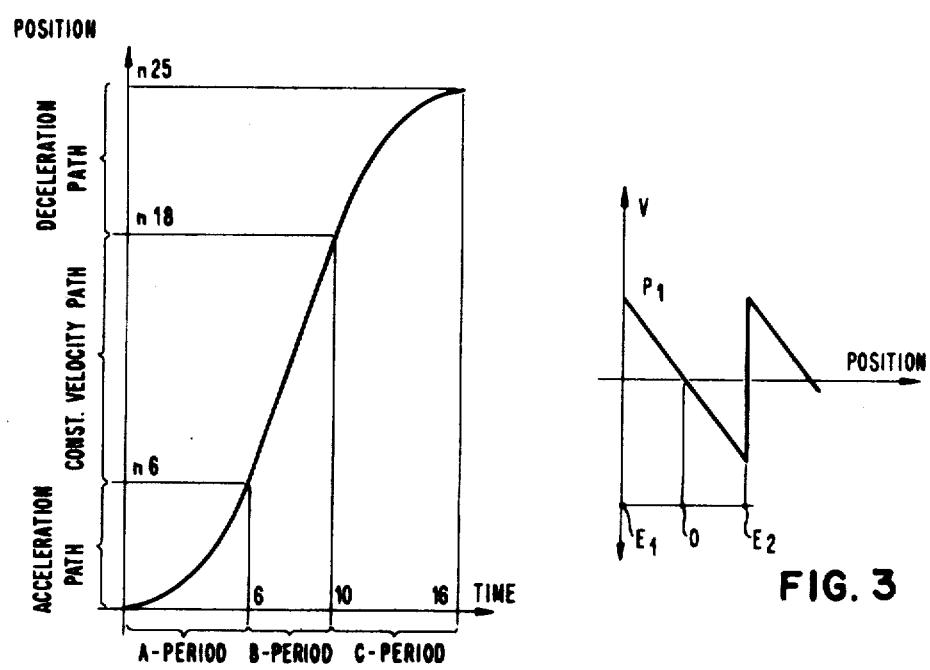
FIG. 3
FIG. 4

SERVO SYSTEM FOR TRACK ACCESSING AND TRACK FOLLOWING IN A DISK DRIVE

DESCRIPTION

Technical Field

This invention relates to a servo system for a disk drive, and in particular, to a position control system for an accessing magnetic head during track accessing and track following.

An object of this invention is to provide a device for regulating magnetic head position during track selection and track following, so that the components of a regulating circuit can be used both for the access motion and for track following of the magnetic head, without the magnetic head being subject to detrimental oscillations.

In accordance with the present invention, a servo system for an accessing type disk drive comprises a position detector that provides digital position error signals, which are applied to the first input of a summing circuit; a track increment generator that samples digital position control signals, with the aid of clock and address signals, which control signals are fed to a second input of said summing circuit; and a compensator coupled to the output of the summing circuit. During the sampling period of a servo sector, a digital position signal generated by the summing circuit and a digital modification signal sampled on a read-only memory of the track increment generator is applied to the compensator.

By means of the servo system of this invention, it is possible to generate, in the current circuit of the drive motor for a magnetic head, a drive current in accordance with a predetermined program sequence from the sum of the digital position error and position control signals, in such a manner that discontinuities of the drive motion of the magnetic head are avoided.

BACKGROUND ART

In some prior art apparatus, servo systems are used to control the speed and position of magnetic head assemblies, which are driven by a motor, across the surface of a rotating storage disk. The servo system provides an initial acceleration, a subsequent uniform speed, and a deceleration of the magnetic head towards the end of the positioning path before the magnetic head reaches the selected track. The speed regulation of the magnetic head is ensured by a tachometer associated with the servo circuit, which is disconnected from the drive motor for the magnetic head when the selected track is reached. Simultaneously, the motor that drives the head assembly is switched on in a servo regulating circuit which causes the magnetic head to be guided over and to follow the center of the recorded track. The servo pattern is recorded on a different surface of a magnetic disk than the data being stored. The servo signals are sampled by a servo head and the data signal by a separate magnetic head. Both servo and data heads are associated with different, but jointly driven access arms, which serve to position the magnetic heads to a selected track.

The disadvantage of such prior art apparatus is that the arrangement of the servo and data signals on different disk surfaces lead to positional differences between the servo head and the data head. The tolerance values of these positional differences are so high that they limit the density of the data tracks of a disk drive.

It is also known, as described in U.S. Pat. No. 3,185,972, to regulate the track following of a magnetic head of a disk drive by means of servo signals that are sampled from a servo pattern that is recorded in servo sectors of the data tracks on a disk surface. The servo sectors are arranged at uniform angular distances between the data sectors of the magnetic disk surface. The sampling of the data and servo sectors is achieved by a magnetic head positioned to a selected data track. For this purpose, the servo circuit is controlled by a switching device that is synchronized with disk rotation and which, as the servo sectors are sampled by the magnetic head, applies sampled servo signals at predetermined time intervals to the magnetic head.

This type of device makes it possible to associate the servo and data magnetic head in a single head arm structure so that, as a result, position differences between the data and servo magnetic transducing elements of the head are eliminated, thereby enabling the increase of density of data tracks. However, the device has the disadvantage that for track selection and track following of the magnetic head, different drive systems are required, which leads to an increase in the mass moment of inertia of the elements being moved, and to a reduction in the positioning speed of the magnetic head.

It has also been proposed, as in copending patent application, Ser. No. 815,394, filed July 13, 1977, now U.S. Pat. No. 4,120,505, and assigned to the same assignee, to regulate magnetic head position during the track accessing and track following modes in such a manner that the same drive system can be used during both modes. In this case, the servo signals for regulating the track following of the magnetic head are recorded in servo sectors of a disk surface. At the beginning of an access motion of the magnetic head, the drive motor of the magnetic head which effects the radial advancing motion of the head is connected to a constant drive voltage during an acceleration phase. The duration of the acceleration phase is controlled by clock signals which are sampled by a fixed magnetic head. The clock signals are utilized for controlling the switching periods of the data and servo sectors. After sampling of a particular number of servo sectors, the drive motor of the magnetic head is connected to a servo regulating circuit for a particular period of time during which the speed of the magnetic head is constant.

After completion of the access motion of the magnetic head, the servo regulating circuit is used to regulate track following. For the duration of a particular number of servo sectors, the servo signals, by means of which the radial position of the magnetic head is indicated during each sector time, are sampled by the servo and data magnetic head for the duration of a sector time. By means of the regulating circuit, an acceleration or deceleration component of the drive signal is produced depending upon whether, at the time of sampling, a leading or lagging track deviation of the magnetic head from the center of a data track is detected. At the end of the period in which the access speed is constant, the drive motor is disconnected from the regulating circuit and connected to a constant voltage for decelerating the magnetic head. The polarity of this voltage is opposite to the polarity of the constant drive voltage to which the drive motor was connected during the acceleration phase. After a particular number of servo sectors has been passed, the magnetic head is stopped on a selected recording track. After the address track position has been reached, the drive for the radial advance of the magnetic head is connected to the regulating circuit for track following.

The apparatus described above offers the possibility of utilizing the drive of a magnetic head both for the duration of an access motion and, after the address position has been reached, for the regulation of track following. There is, however, the disadvantage that the switching processes of the drive voltage lead to discontinuities of the drive force acting on the drive motor of the magnetic head, so that oscillations of the moving head assembly reduce the positioning accuracy and the positioning speed of the magnetic head.

BRIEF DESCRIPTION OF THE DRAWING

The invention will be described in detail with reference to the drawing in which:

FIG. 2 illustrates the recording pattern of servo marks recorded in the servo sector of a magnetic disk, as employed in this invention;

FIG. 3 represents the waveform of the digital output signal, of the analog/digital converter illustrated in FIG. 1, which is produced by position errors of the servo and data magnetic head;

FIG. 4 represents the waveform of the digital signals of a track increment generator, which signals are introduced into the control circuit for track following and which are summed to the digital position error signals of the track follower regulating circuit;

DISCLOSURE OF THE INVENTION

Figure 1:
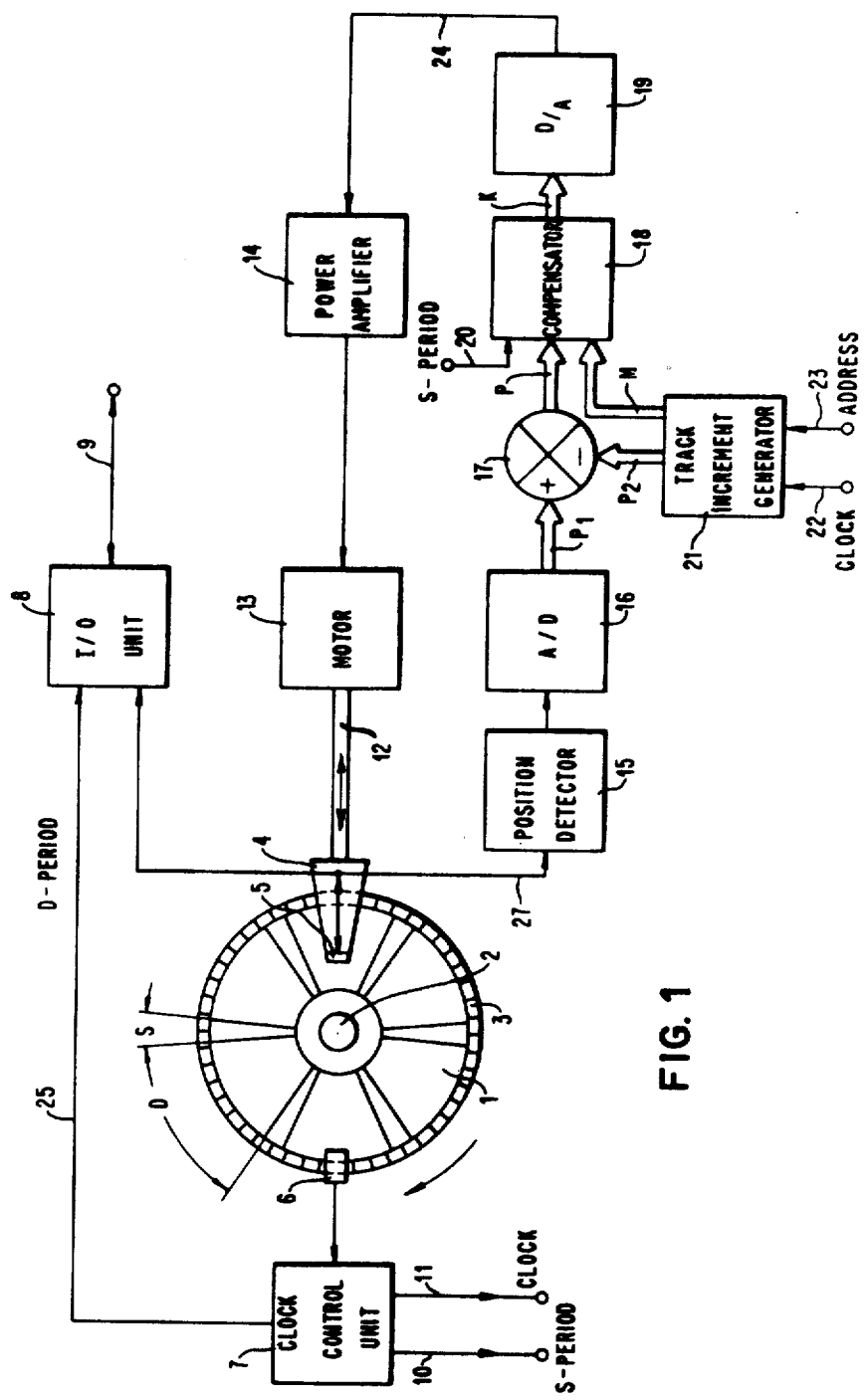
FIG. 1 is a block and schematic diagram of a servo system for controlling magnetic head position during track selection and track following, in accordance with this invention.
Figure 5:
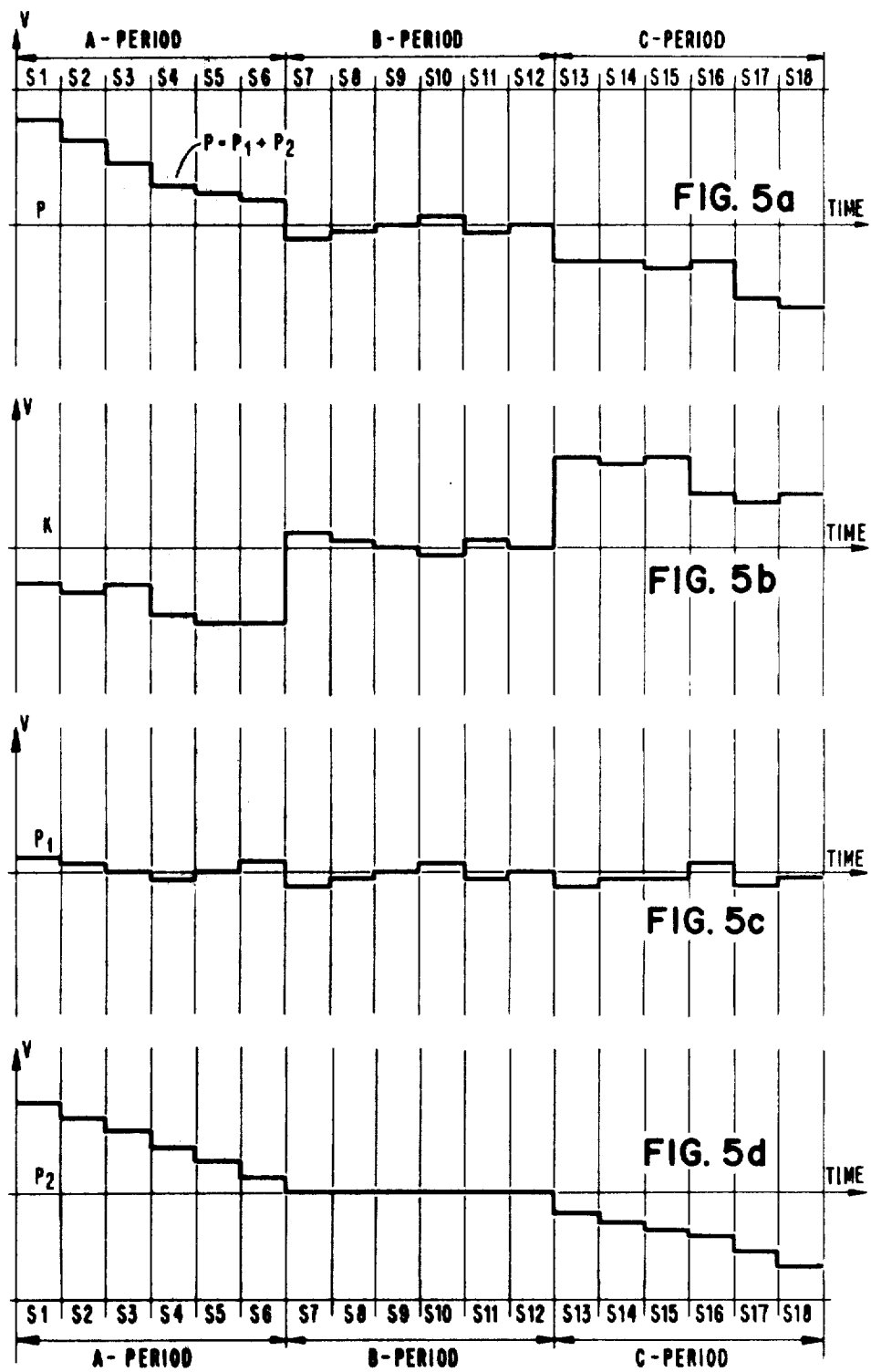
FIG. 5a–5d are voltage characteristics of the position error, position control, position and compensating voltages of the servo and data magnetic head during an access motion in functional dependence of the time expressed by the number of sampled servo sectors.

As shown in FIG. 1, a servo system for a disk drive includes a magnetic disk 1 which is rotatably supported on a hub 2, and is rotated by a drive motor (not shown). A magnetic head 5 fixed to a magnetic head support 4 of a head arm 12 can be positioned in a radial direction to concentric recording tracks of a magnetic disk 1 by means of a drive motor 13, such as a voice coil motor for example. The surface of the magnetic disk 1 is divided into a random number of data sectors D and servo sectors S in which data and servo signals respectively are recorded in the associated angular areas. On the outer circumference of the magnetic disk 1, clock signals which can be sampled by a fixed head 6 are recorded in a clock track. The clock signals sampled by the fixed head 6 are converted into time control signals by means of a clock control or switching device 7. The time control signals are fed to an input of the data input/output 8 via line 25. The magnetic clock generation can be replaced by optical clock generation, as known in the art. The time control signals transferred by line 25 determine the time control signals, by means of which during the "D sector times", the input/output signals transferred between the magnetic head 5 and the data input/output 8 are fed from and to the output line 9. The clock control 7 also produces time control signals which on the output line 10, during the "S sector times" control the sampling of the servo sectors S on the magnetic disk 1. From the output line 11 of the clock control 7, clock signals for the generation of position control signals are derived which are used to control the drive motor 13 of the head arm 12.

The drive motor 13 of the head arm 12 is connected to a track follower regulating circuit to which servo signals sampled on servo marks are applied via line 27, as the servo sectors S pass the magnetic head 5. By means of a position detector 15, track deviations of the magnetic head 5 from the center of a data track are detected and converted into corresponding position error signals. An analog-to-digital converter 16 converts these position error signals into digital position error signals P1, which are fed to a first input of a summing circuit 17. A second input of the summing circuit 17 receives digital position signals P2, which are generated by the track increment generator 21. The position control signals P2 are generated under the control of clock signals which are derived from the switching device 7 and are fed to a first input line 22 of the track increment generator 21. Via a second input line 23, the track increment generator 21 receives address signals which determine a selected recording track of the magnetic disk 1 to which the magnetic head is to be positioned. By the summing circuit 17, the digital position error signals P1 and the digital position control signals P2 are summed to derive position control signals P, which are applied to a first input of the compensator 18. To a second input 20 of the compensator 18, "S sector time" control signals are applied, by means of which K signals are generated each time a servo sector passes the magnetic head 5. The K signals represent digital compensation values of the position control signals P. These compensation signals remain constant for the time during which the subsequent data sector D passes the magnetic head. The digital compensation signals K derived from the output of the compensator 18 are converted by a digital-to-analog converter 19 into corresponding analog signals and are transferred across line 24 to a power amplifier 14, and to the drive motor 13. During the access time, the head arm causes the magnetic head 5 to be positioned in a path, the positions of which are time dependent according to the number of servo sectors sampled by the magnetic head 5, as illustrated in FIG. 5a–d. The path/time diagram determined by the track increment generator 21 is divided into an A period, during which an acceleration path is covered, into a following B period, in which a constant speed path is covered, and into a C period during which a deceleration path is covered.

The servo marks recorded on the magnetic disk 1 in the servo sectors S are illustrated in FIG. 2. In a servo sector S, bounded on both sides by data sectors D, magnetic servo marks of opposite polarity and opposite phase respectively, are recorded. Two different servo marks of opposite polarity which are recorded on both sides of a track at the same track width W2, form a servo track of track width W1. A data track in the data tracks D has the track width W2. Each data track is limited by two track lines E between which the center line 0 of a data track extends. The servo and data magnetic head 5, fixed to the head arm 12 has a track width W2. In the normal, error-free sampling position the magnetic head 5 is exactly over the center line of a servo track and the center line 0 of a data track, respectively. Deviations of magnetic head position from the center position, either in the region of the positive or in the region of the negative polarity of the servo marks, lead to position error signals. The position error signals continue to indicate track deviations of the magnetic head, if at maximum track deviation from the normal position, the head is deflected either into the positive marking range or into the negative marking range of the servo marks on both sides of a track line 0, as illustrated by broken lines.

The course of a position error voltage P1 may be seen from the illustration of FIG. 3. If the track position of the magnetic head 5 between the two track lines E1 and E2 bounding a data track changes, a linearly descending course of the position error voltage occurs, which is a function of the track position and whose signal value is 0 when the magnetic head is accurately centered over the center line 0. In this normal position the magnetic head 5 samples equally large track halves of the positive and the negative servo marks, the signal components of which cancel each other upon sampling. In the position in which the magnetic head 5 exclusively records the signal component of the positive polarity of the servo marks, the position error signal P1 reaches its positive maximum value. In the opposite marginal position in which the magnetic head 5 exclusively records the signal component of the negative polarity of the servo marks, the position error signal P1 reaches its negative maximum value. The compensator of the track follower regulating circuit operates in such a manner that upon the occurrence of a position error signal P1 in the regulating circuit, it generates a compensation signal which decreases the position error, thus stabilizing the position of the magnetic head over the center line 0 of the recording track.

FIG. 4 shows the path/time diagram of the magnetic head 5 which is followed as a result of an access motion of the magnetic head to the selected recording track of the track address n25 of the magnetic disk 1. During the time in which six servo sectors pass the magnetic head 5, the head is accelerated during the A period. In this period of time the magnetic head 5 crosses six recording tracks. The subsequent B period, during which the magnetic head 5 is moved at a constant speed, has a duration corresponding to the sampling time of four servo sections, i.e., the period lasts up to the sampling of the tenth servo sector. During this period of time, three recording tracks are crossed during the time in which one servo sector passes the magnetic head. At the end of this period, the magnetic head reaches the track address n18. This is followed by the C period in which the access motion of the magnetic head 5 is decelerated during the sampling time of six servo sectors. At the end of the deceleration path, in the course of which the magnetic head 5 crosses seven recording tracks, the head reaches the track address n25 preselected by addressing. In this track position the access motion of the magnetic head ends, so that the position control signals P2 generated at the output of the track increment generator 21 of FIG. 1 for controlling access motion are interrupted. As a result, the track selection regulating circuit is switched to regulate the position of the magnetic head 5 for track following over the center of the recording track n25.

The signal/time diagram illustrated in FIG. 5a shows the dependence of the digital position signals P generated on the output of the summing circuit 17, which is shown in FIG. 1. By means of the compensator 18, digital K signals corresponding to the position signals P are generated. By means of the digital to analogue converter, the K signals are converted into analogue signals feeding the drive motor 13. The digital position signal P shown in FIG. 5a is obtained by summing in the summing circuit 17 the digital position error signal P1 of FIG. 5c to the digital position control signal P2 of FIG. 5d. Upon crossing the recording tracks n1 to n25, the magnetic head 5 is accelerated in the acceleration path during the time in which the servo sectors S1 to S6 pass the magnetic head. For this purpose, the track increment generator 21 generates position control signals P2 in accordance with a given program, which in the direction of movement of the access path have constant digital values for duration of one or several track crossings. This determines the course of the digital position signals P. By means of the compensator 18, a corresponding digital compensation signal K, illustrated in FIG. 5b is generated. The K signal drives the magnetic head in the direction of the target address of the recording track n25. Because of detuning as a result of the added component of the position control signal P2, the track follower regulating circuit cannot effect a zero compensation for stabilizing the position of the magnetic head in the center of the recording track n1. The position control signals P2 are dimensioned in accordance with a given program in such a manner that the magnetic head 5 passes the acceleration path of FIG. 4 for the duration of the A period until the track address n6 is reached.

As the magnetic head enters the constant speed phase of the B period, position error signals P1 are transferred to the summing circuit 17 only if during the time in which a data sector D passes the magnetic head, the head does not have to cross all the recording tracks. At the end of the B period, the magnetic head has reached the track address N18.

In the subsequent deceleration phase, position control signals P2, having an opposite polarity to the position control signals P2 which are active in the acceleration phase, are derived from track increment generator 21. These control signals generate negative acceleration forces, so that the magnetic head 5 in the C period follows the deceleration path of FIG. 4 until the selected track addresses n25 have been reached. During the C period signal P generates a compensation signal K which stops the magnetic head.

At the end of the A period and at the end of the C period, modification signals M are transferred in each case from an output of the track increment generator 21 to an input of the compensator 18, so that the compensation signal K stored in the compensator is changed in such a manner that the magnetic head 5 is transferred to the subsequent track following mode without overshooting. By means of the compensator 18, compensation signals K are computed from the position signals P. These compensation signals are obtained in accordance with the following algorithm:

$$k(T) = \text{const.}P(T) + a1P(T-1) + a2P(T-2) + \ldots ] - b1K(T-1) + b2K(T-2)$$

where P(T) and K(T) represent position and compensation signals at the sampling times T and at the preceding sampling points (T−1), (T−2) . . . , respectively. The constants a1 . . . an, and b1 . . . bn are a function of the characteristics of the regulating system, such as mass, threshold frequency, frictional losses, and the electrical time constants of the energizing voltage. They determine the transfer function of a linear controlled system, as described in detail in chapter 7.2, pp. 147 and 148, of the book "Sampled-Data Control System" by J. R. Ragazzini et al, McGraw-Hill, 1958.

Figure 6:
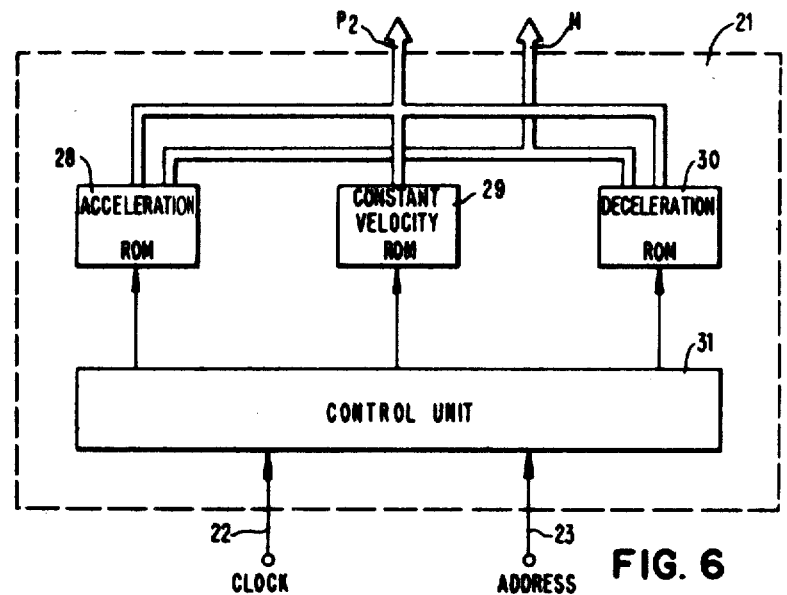
FIG. 6 is a block diagram depicting the switching elements of a track increment generator.

FIG. 6 shows the individual switching elements of the track increment generator 21 illustrated in FIG. 1. The generator comprises a control device 31, which receives clock signals from the output line 11 of the switching device 7 of FIG. 1 over input line 22. To the second input line 23 address signals are applied, indicating to which recording track on the magnetic disk 1 the magnetic head 5 is to be positioned. As a function of the clock and address signals applied respectively to the input lines 22 and 23, the control device 31 generates control signals which at the different A, B, and C periods are transferred to read-only memories 28, 29 and 30. The read-only memories contain storage values for the track increments, which can be sampled in accordance with a particular program. For generating the digital P2 position control signals, the track increments are transferred to an output line in a predetermined time sequence. Via another output line of the track increment generator 21, the modification signals M generated at the end of the A period and the C period are transferred to an input on the compensator 18. The A, B, and C control signals are made available as a function of the entered address in accordance with a particular program controlling the acceleration, the constant speed, and the deceleration of the magnetic head 5. Thus, it can be assumed, for example, that deviating from the addressing of the magnetic head 5 to the recording track n25, in accordance with the embodiment described by means of the illustration of FIGS. 4 and 5, the magnetic head 5 is to be addressed to the recording track n28. In this case it is merely necessary to extend the B time of the constant speed range by one sector interval with the aid of the control device 31. In accordance with the given prerequisites, it is assumed that the position control signals P2 derived from the read-only memory effect a speed of the magnetic head 5, which equals three track crossings per sector interval. Extensions of the B period by one sector interval each thus lead to recording tracks n28, n31, n34 . . . or, in the case of reductions in the B time by one sector interval, to recording tracks, n22, n18, n15 to be optionally addressed. The intermediate values of the address sequence, e.g., of the recording tracks n26 and n27, can be set at equal track increment values sampled on the read-only memory 29, if the acceleration of the A period or the deceleration of the C period are extended by one or two sector intervals. If the recording track n26 is selected, it can be assumed, for example, that the magnetic head 5 reaches the necessary access speed of three track crossings per sector interval in the constant speed range after seven rather than six sector intervals. For this purpose it is necessary that the A period of the acceleration phase comprises seven sector intervals, and that the position control values sampled on the read-only memory 28 are changed. The magnetic head can be correspondingly positioned to the selected recording track n27 when the A period comprises seven sector intervals and the C period eight sector intervals.

The position control values sampled on the read-only memory 30 must also be changed for this purpose, so that the magnetic head 5 having a positioning speed of three track crossings per sector interval in the constant speed range reaches the zero value in the extended B period. The sampling of the track increment values necessary for a predetermined track addressing of the magnetic head and the dimensioning of the A, B, and C periods necessary for this purpose is ensured by means of the address value entered via the line 23.

Figure 7:
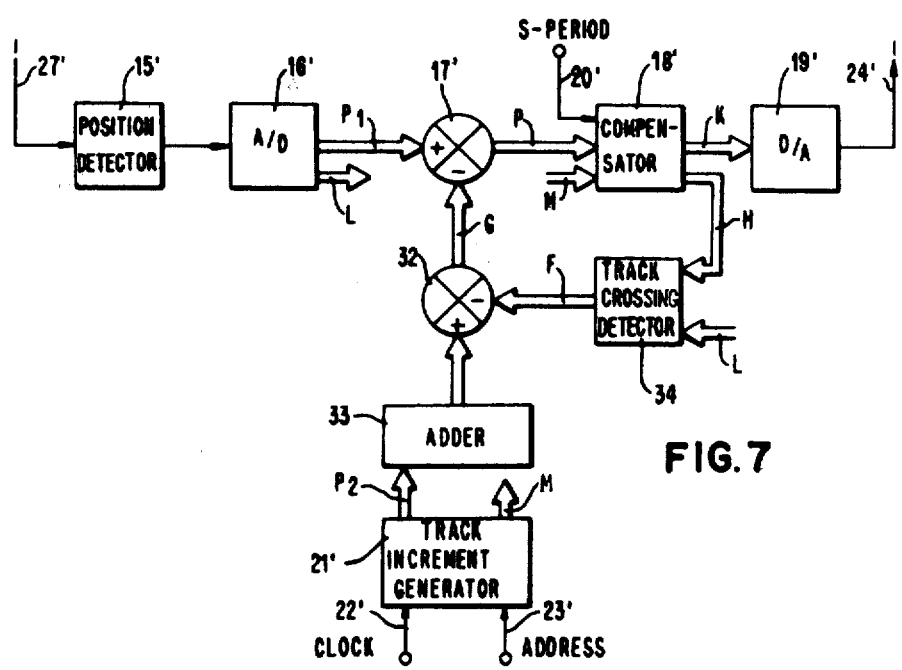
FIG. 7 is a block diagram of an alternative embodiment of a device for regulating the magnetic head position during track selection and track following of the magnetic head, within the scope of this invention.

FIG. 7 shows an alternative for generating the position control signals, which for the purpose of performing a track access motion of a magnetic head are introduced into the track follower regulating circuit. The device is operated in such a manner that the digital position control signals P2 derived from the output of the track increment generator 21' are added by the adder 33 for each track crossing and are fed to an input of the summing circuit 32. From an output of the compensator 18' and an output of the a/d converter 16' signals H and L are transferred to the inputs of the track crossing detector 34. The output signal F of the track crossing detector 34, whose value is proportional to the number of recording tracks crossed by the magnetic head 5, is transferred to a second input of the summing circuit 32.

The position control and track change signals applied to both inputs of the summing circuit 32 have opposite signs, so that on the output of the summing circuit 32 the difference between the two input signals is applied as control signal G to the track follower regulating circuit, in order to be summed with the position error signal P1 in the summing circuit 17'. The function of the position detector 15' connected to the line 27' and of the d/a converter connected to the line 24' corresponds respectively to the circuit elements 15 and 19 of FIG. 1.

Signals P1, P2, P, M, K, F, G, H, and L described by means of FIGS. 1 and 7 are multiposition, preferably binary-coded, digital signals. By means of the device depicted in FIG. 7, the direction of the access motion of the magnetic head can be detected in the case of an address operation mode, so that erroneous positioning of the magnetic head is avoided.

Having thus described my invention, what I claim as new, and desire to secure by Letters Patent is:

1. A servo system for a disk drive having a magnetic disk recorded with data signals and with interleaved servo signals, a magnetic head for sensing said data and servo signals and a motor for driving said head to access data tracks on said disk comprising:
   a position detector for providing first position error signals in response to sensed servo signals;
   a track increment generator for generating second position error signals under control of clock and address signals;
   a summing circuit coupled to said position detector and to said track increment generator for summing said first and second error signals and for producing a combined position error signal; and
   a compensator coupled to said summing circuit and to said track increment generator for providing a compensating signal to said drive motor of said accessing head.

2. A servo system as in claim 1, wherein said track increment generator includes a plurality of read-only memories that are sampled during respective phases of said track access mode of said magnetic head.

3. A servo system as in claim 1, including a clock control unit for providing clock signals for generating position control signals to control the drive motor for said magnetic head.

4. A servo system as in claim 1, including an analog to digital converter coupled to the output of said position detector for providing digital position error signals to said summing circuit.

5. A servo system as in claim 1, including a digital to analog converter coupled to the output of said compensator for providing an analog compensating signal to said head drive motor.

6. A servo system as in claim 1, including a track crossing detector coupled to the output of said compensator, an adder coupled to the output of said track increment generator, and a second summing circuit coupled to the output circuits of said track crossing detector and said adder, the output of said second summing circuit being coupled to an input circuit of said first recited summing circuit.

7. A servo system as in claim 6, wherein said compensator, said track crossing detector and said summing circuits are in a closed loop.

* * * * *